United States Patent Office 2,759,912
Patented Aug. 21, 1956

2,759,912
MONOMERS, POLYMERS, AND COPOLYMERS OF ALLYL ESTERS OF TRIFLUOROACETIC ACID

Harry W. Coover, Jr., and Joseph B. Dickey, Kingsport, Tenn., assignors to Eastman Kodak Company, Rochester, N. Y., a corporation of New Jersey No Drawing. Application July 31, 1952,
Serial No. 301,955

8 Claims. (Cl. 260—85.5)

This invention relates to new polymerizable materials comprising allyl and methallyl esters of trifluoroacetic acid, to methods of making these esters, to plastic masses containing the polymerized esters and to interpolymers of these esters with other nonomeric materials, in particular with polymerizable monosubstituted mono-ethylenically unsaturated compounds such as styrene, methylmethacrylate, acrylonitrile, vinyl chloride, methacrylonitrile and others.

It has been found that allyl esters of trifluoroacetic acid may be polymerized to yield useful plastic masses. This is particularly true of interpolymers of the esters with other monomeric substances which may be generally included by the term polymerizable mono-substituted monoethylenically unsaturated compounds.

Quite unexpectedly it has been found that the monomers of this invention polymerize much more readily than the corresponding non fluorinated compounds, and they yield polymeric products having unexpectedly higher softening points and flame resistance, thus rendering them of far greater utility than the non fluorinated polymers or the fluorinated vinyl esters.

Accordingly it is an object of our invention to provide new compounds comprising the allyl esters of trifluoroacetic acid. Another object is to provide polymers and copolymers of the allyl esters of trifluoroacetic acid. A further object is to provide polymeric materials having unusually high softening points and flame resistance.

The new polymers may be prepared in mass, in solution, in suspension or emulsion in aqueous or other suitable diluents.

The usual catalyst as "initiating" agents are used and certain so-called activating agents such as sodium bisulfite may be used in connection with the usual catalyst. Other sources of activation are illustrated by $\alpha$-rays, X-rays, light, heat and organic compounds that break down to give free radicals other than peroxides.

The homopolymers of allyl trifluoroacetate are in general low molecular weight liquid products. Copolymerization with other vinyl monomers, particularly in the range of 4 to 95 perecent of the vinyl monomer, leads to solid polymers. The properties of the various copolymers are dependent upon the type of monomer and the amount of it present in the polymers. Products ranging from soft rubbery materials to high softening rigid polymers can be obtained. Thus, molding, and fiber and film forming materials of considerable value are provided.

The new monomers are readily prepared by reacting trifluoroacetic anhydride with an allyl alcohol.

The following examples will further illustrate the invention.

Example 1.—Allyltrifluoroacetate

Forty-five grams of trifluoroacetic acid and 23 g. of allyl alcohol were placed in a round bottom flask equipped with a reflux condenser and refluxed for 2 hours. Fractionation gave 52 grams of product; B. P. 66–67° C.

Example 2.—Methallyltrifluoroacetate

Thirty-three grams of methallyl alcohol and 45 g. of trifluoroacetic acid were placed in a round bottom flask equipped with a reflux condenser and refluxed for several hours. Fractionation of the reaction mixture gave 55 g. of product; B. P. 83–85° C.

HOMOPOLYMERS

Example 3

Ten grams of allyltrifluoroacetate and 0.3 g. of acetyl peroxide were heated in a sealed tube at 100° C. for 48 hours. The resultant polymer was a clear, viscous oil soluble in acetone.

Example 4

Ten grams of methallyltrifluoroacetate and 0.3 g. of acetyl peroxide were heated at 100° C. in a sealed tube for 48 hours. The resultant polymer was a clear, viscous oil, soluble in acetone.

COPOLYMERS

Example 5

Nine grams of styrene, 1 g. allylthrifluoroacetate and 0.1 g. of acetyl peroxide were heated at 60° C. in an atmosphere of nitrogen for 24 hours. Product is a hard, clear, moldable polymer. The polymer is soluble in benzene.

Example 6

Eight grams of methylmethacrylate and 2 g. of methallyltrifluoroacetate were copolymerized at 60° C. in an atmosphere of nitrogen using 0.5 per cent benzoic peroxide as a catalyst. The product is a hard, clear, moldable polymer. The polymer is soluble in acetone.

Example 7

Eight grams of acrylonitrile, 2 g. of allyltrifluoroacetate, 0.1 g. of ammonium persulfate and 0.1 g. of sodium bisulfite were added to 100 ml. of distilled water. The polymerization started immediately at room temperature and was complete within several hours. The precipitated polymer was filtered, washed and dried. The polymer is soluble in such solvents as dimethylacetamide and dimethylformamide.

Example 8

Five grams of methallyltrifluoracetate and 10 g. of vinyl chloride were emulsified in 50 ml. of water using 0.5 g. of polyvinyl alcohol as an emulsifying agent, and polymerized at 60–70° C. using ammonium persulfate as a catalyst. After about 15 hours acetic acid was added and the white precipitated polymer was filtered, washed and dried. The polymer is soluble in cyclohexanone.

Example 9

Five grams of methacrylonitrile and 5 g. of allyltrifluoroacetate were added to 100 ml. of water containing 0.2 g. of ammonium persulfate, 0.2 g. of sodium bisulfite and 1 g. of potassium laurate. Polymerization was completed by heating to 50° C. for a period of 48 hours. The resultant polymer is soluble in acetone.

In general, as illustrated by the above examples of copolymerization, the trifluoro esters of the invention can be copolymerized with any polymerizable monoethylenically unsaturated compound which is monosubstituted.

We claim:

1. Homopolymers of compounds selected from the group consisting of the allyl and methallyl esters of trifluoroacetic acid.

2. The homopolymer of the allyl ester of trifluoroacetic acid.

3. The homopolymer of the methallyl ester of trifluoroacetic acid.

4. Copolymers of a compound selected from the group consisting of the allyl and methallyl esters of trifluoroacetic acid with a compound selected from the group consisting of styrene, methylmethacrylate, acrylonitrile, vinyl chloride and methacrylonitrile.

5. As a new compound, the allyl ester of trifluoroacetic acid.

6. As a new compound, the methallyl ester of trifluoroacetic acid.

7. A method of forming a polymeric material having a high softening point and flame resistance comprising copolymerizing in the presence of a polymerization catalyst an ester selected from the group consisting of the allyl and methallyl esters of trifluoroacetic acid with a compound selected from the group consisting of styrene, methylmethacrylate, acrylonitrile, vinyl chloride and methacrylonitrile.

8. As a new compound an ester of trifluoroacetic acid selected from the group consisting of the allyl and methallyl esters.

References Cited in the file of this patent

UNITED STATES PATENTS

| | | |
|---|---|---|
| 2,436,144 | Howk | Feb. 17, 1948 |
| 2,446,114 | Strassburg | July 27, 1948 |
| 2,525,526 | Coover | Oct. 10, 1950 |